United States Patent [19]

Ikeda

[11] 4,304,425

[45] Dec. 8, 1981

[54] TUBULAR SEALING DEVICE

[75] Inventor: Tadashi Ikeda, Osaka, Japan

[73] Assignee: Fujisawa Pharmaceutical Co., Ltd., Osaka, Japan

[21] Appl. No.: 54,648

[22] Filed: Jul. 3, 1979

[30] Foreign Application Priority Data

Jul. 10, 1978 [JP] Japan ................................ 53-84440

[51] Int. Cl.³ ...................... A61M 25/00; F16J 15/00
[52] U.S. Cl. ............................. 285/177; 277/207 A; 285/DIG. 12
[58] Field of Search ....... 215/307; 285/177, DIG. 12, 285/334.4; 277/203, 233, 207 A

[56] References Cited

U.S. PATENT DOCUMENTS 2,412,531 12/1946 Pape ..................................... 285/177
2,507,535 5/1950 Madsen ............................... 285/177
3,123,072 3/1964 Bellamy ............................. 285/177
3,995,888 12/1976 McIlroy ............................. 285/177

*Primary Examiner*—Robert I. Smith
*Attorney, Agent, or Firm*—Oblon, Fisher, Spivak, McClelland & Maier

[57] ABSTRACT

A new tubular sealing device made of soft elastic material and having a bore circular in cross section and extending axially therethrough, the sealing device including an inverted frustoconical outer periphery and an inner peripheral surface defining the bore, the inner peripheral surface having a constricted portion of the smallest diameter, an upper portion extending upward from the constricted portion with a progressively increasing diameter to define a tapered bore section and a lower portion extending downward from the constricted portion to define a bore section having a larger diameter than the constricted portion.

4 Claims, 12 Drawing Figures

TUBULAR SEALING DEVICE

BACKGROUND OF THE INVENTION

1. Field of the Invention

The present invention relates to a new tubular sealing device which is adapted to hermetically hold a filtration apparatus with a suction bottle, when such a filtration apparatus is used for the sucking filtration and which is also serviceable for other similar uses. More particularly the invention relates to a novel tublar sealing device which is commonly usable for any of various filtration apparatus such as glass filters, funnel, nutsch filter or the like mainly used in chemical experiment and the same of varying sizes.

2. Description of the Prior Art

With reference to FIGS. 1 and 2, a rubber stopper 3 is used, for example, for holding a glass filter 1 or the like to a suction bottle 2 or the like. Since glass filters, suction bottles, etc. are available in many sizes, a rubber stopper suited to the size contemplated was formerly selected and bored to an appropriate size for use. However, it was cumbersome to select a rubber stopper and bore the stopper every time it is needed for an experiment, while this was wasteful of rubber stoppers, so that a rubber stopper 3' as shown in FIG. 3 has recently been introduced into use.

The rubber stopper 3' includes a plurality of short elastic tubular members having varying inside and outside diameters and fitted together in combination, such that tubular members of suitable sizes can be selectively used in combination in conformity with the sizes of the glass filter 1 and the suction bottle 2. For example, when a glass filter 1 of small size is used for a suction bottle 2 with a relatively large mouth, rubber members 3' are employed as fitted together one within another as seen in FIG. 4. The rubber stopped 3' nevertheless will not be airtight between the fitting surfaces of the rubber members 3'a, 3'b and 3'c, with the resulting tendency to give reduced suction. Thus the larger the number of the rubber members 3' in combination, the lower the airtightness will be. Further when a glass filter 1 of large size is used for a suction bottle 2 having a small mouth, a rubber stopper 3'c of appropriate size is selected for use as shown in FIG. 5, but the rubber stopper 3'c serves as a seal only at its top portion, affording low suction or possibly failing to give any suction.

SUMMARY OF THE INVENTION

Directing attention to the foregoing problems, the inventor of the present invention has conducted extensive research in an attempt to develop a sealing device which is commonly usable for various glass filters, suction bottles and the like having varying sizes and which assures outstanding airtightness, and found that the above object can be fulfilled ingeniously with a rubber stopper of the following construction. Thus this invention has been accomplished.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views, and wherein.

DESCRIPTION OF THE PREFERRED EMBODIMENTS

Accordingly, it is one object of this invention to provide a new sealing device which is commonly usable for any of various filtration apparatus such as glass filters, funnels, nutsch filter and the like having varying sizes and which assures outstanding airtightness.

Another object of this invention will be apparent from the description hereinafter.

According to this invention, the new tubular sealing device has the following characteristics:

The tubular sealing device is made of soft elastic material and has a bore circular in cross section and extending axially therethrough, the sealing device including an inverted frustoconical outer periphery and an inner peripheral surface defining the bore, the inner peripheral surface having a constricted portion of the smallest uniform diameter portion, an upper portion extending upward from the constricted portion with a progressively increasing diameter to define a tapered bore section and a lower portion extending downward from the constricted portion to define a bore section having a radially outwardly stepped uniform larger diameter portion than the constricted portion.

The features and advantages of this invention will be described below in detail with reference to the drawings showing an embodiment. The illustrated embodiment nevertheless is merely typical of the invention and can of course be modified in view of the features stated above and to be described below. Such modifications are included within the scope of the technique of the invention.

Figure 1:
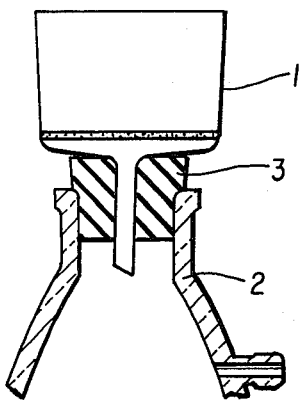
FIGS. 1 to 5 are views showing known sealing rubber stoppers and examples thereof in use, FIGS. 1, 2, 4 and 5 being sectional views, and FIG. 3 being a perspective view.
Figure 2:
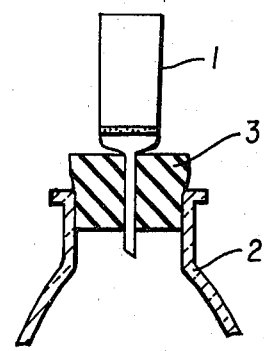
Figure 3:
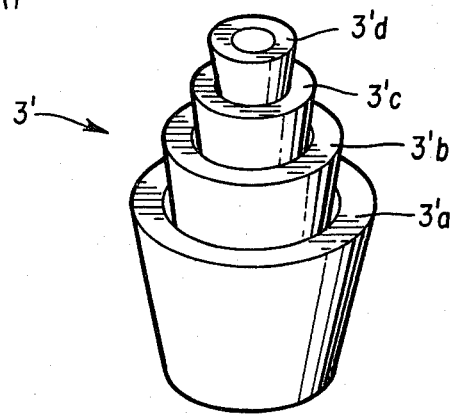
Figure 4:
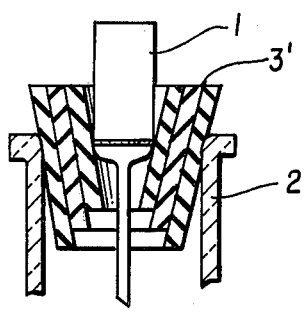
Figure 5:
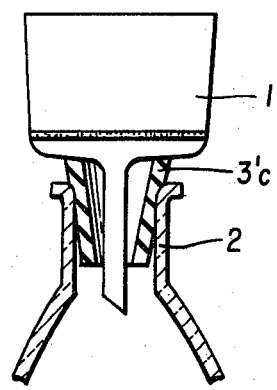
Figure 6:
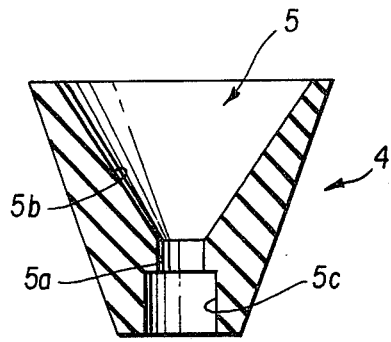
FIGS. 6 to 12 are views in section showing a sealing device of the invention and examples thereof while in use.

FIG. 6 is a view in vertical section showing a sealing device 4 embodying the present invention. The device has an inverted frustoconical outer periphery and an inner peripheral surface defining a bore 5 extending axially therethrough and circular in cross section. The inner peripheral surface has a constricted portion 5a formed in the vicinity of its midportion and has the smallest diameter, an upper portion 5b extending upward from the constricted portion with a progressively increasing diameter to define a tapered bore section and lower portion 5c extending downward from the constricted portion 5a to define a bore section having a larger diameter than the constricted portion 5a.

Figure 7:
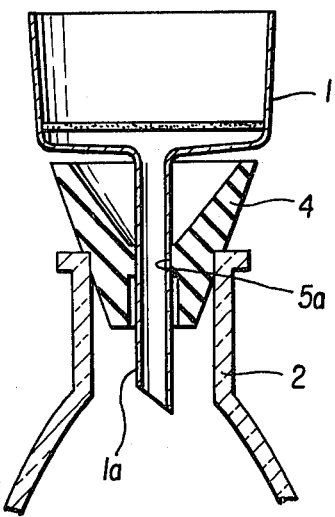
Figure 8:
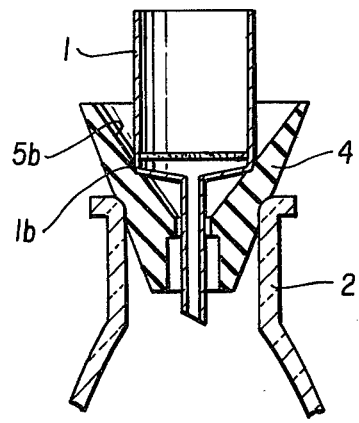
Figure 9:
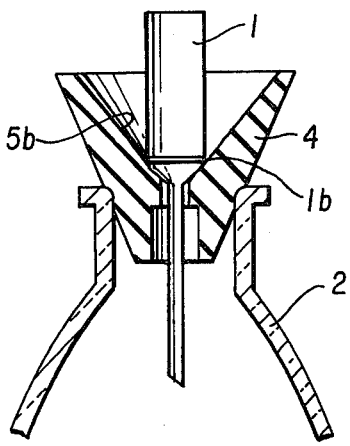

The sealing device 4 can be used, for example, in the manner shown in FIGS. 7 to 9 and can be commonly used for glass filters, etc. of varying sizes free of any trouble. More specifically stated, FIG. 7 shows the device as used for a glass filter 1 of large size. The leg 1a of the glass filter 1 is pushed through the constricted portion 5a, which in turn hermetically holds the leg in pressing contact therewith. FIGS. 8 and 9 show the device as used for a glass filter 1 of relatively small size. The bottom 1b of the glass filter 1 is in pressing contact with a portion of the tapered bore section 5b which portion provides an airtight seal.

Thus the use of the sealing device 4 of this invention, which affords a hermetic seal at the constricted portion 5a or tapered bore section 5b of the inner peripheral surface defining bore 5, assures outstanding airtightness for various glass filters 1 and other devices alike in spite of the difference in size.

Further, the sealing device of this invention has the following advantage:

The larger cylindrical hole which is formed by a constricted portion and a bore section having large diameter than the constricted portion, not only makes it easier for glass filters and the like to be inserted into or pulled out from the sealing device, but also makes the glass filters and the like equipped to the sealing device stable.

Although the sealing device 4 can be made from any material insofar as it is suitably soft and elastic, it is most usual to use natural, synthetic or silicon rubbers, among which silicone rubber is best suited because the silicon rubber has pertinent chemical and physical properties such as high stability against acids, bases and weather, insolubility in a wide variety of solvent and less sensitivity to light and temperature.

Figure 10:
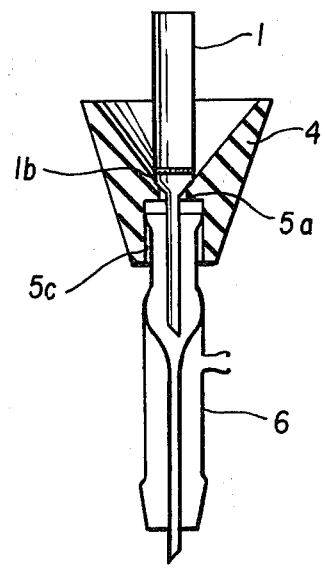

FIG. 10 shows another mode in which the sealing device 4 of this invention is used. An aspirator 6 is fixedly fitted at its upper end in the bore section 5c having large diameter than the constricted portion 5a with the bottom 1b of a glass filter 1 in pressing contact with the tapered section 5b. The assembly is adapted for filtration by suction. The sealing device 4 of the invention is usable to provide such a special assembly for filtration.

Figure 11:
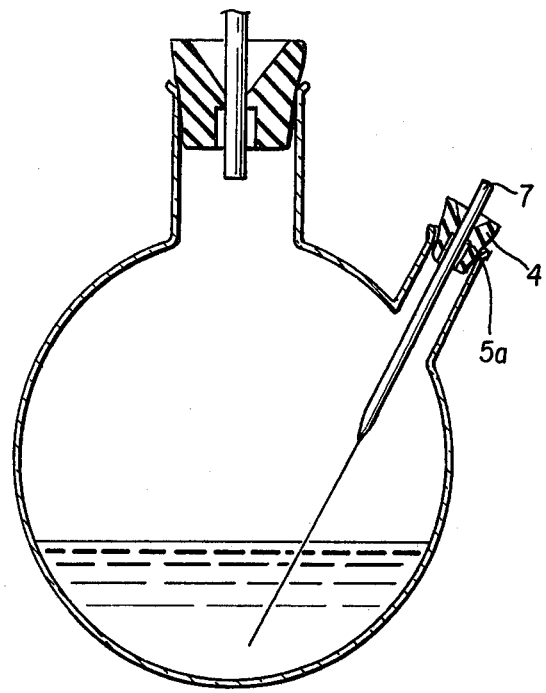
Figure 12:
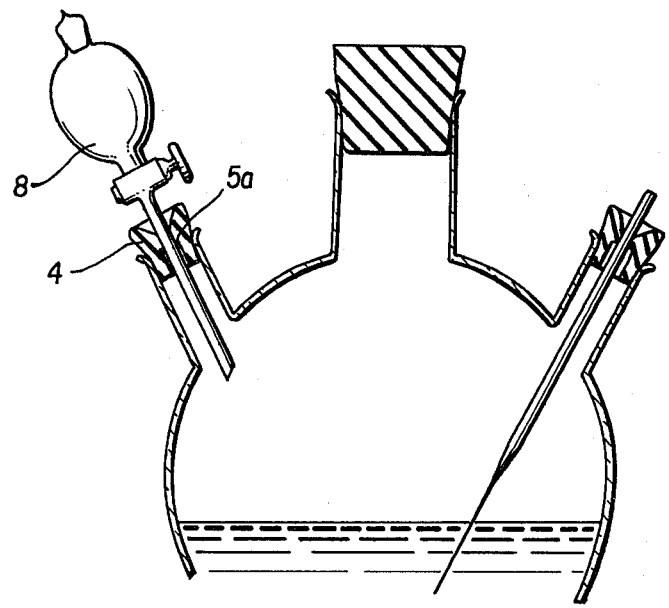

While the device of the invention generally having the construction described above is useful for glass filters, nutsch filters and the like for filtration by suction, the device which affords outstanding airtightness is also useful when installing a capillary tube 7 in place for vacuum distillation as seen in FIG. 11, or when holding a dropping funnel 8 in position for example as adapted for reaction in a vacuum as illustrated in FIG. 12. In this case, the constricted portion 5a provides a hermetic seal.

While the construction shown in FIG. 6 is most typical of the sealing devices of this invention, the invention is not particularly limited in the length and inclination angle of the tapered portion 5b, the diameter and length of the constricted portion 5a and the bore section 5c having large diameter than the constricted portion 5a, etc. The device can be modified suitably as desired without in any way departing from the technical scope of this invention. The sealing device 4 is designed to have an inverted frustoconical outer periphery so as to be commonly usable for suction bottles or the like having mouths of varying sizes. The angle of inclination of the periphery is not limited to that illustrated either, but can be altered as desired.

The device of this invention with the foregoing structure is shaped ingeniously so that a single sealing device is commonly usable for any of filtration apparatus such as glass filters, funnel, nutsch filters, and other airtight apparatus such as inlet or outlet transportation tubes, capillary tube, condenser, thermometer, etc. in different sizes, while assuring outstanding airtightness at all times. Thus the present device is very useful.

What is claimed is:

1. A tubular sealing device made of soft elastic material and having a bore circular in cross section and extending axially therethrough, which comprises an inverted uniformly frustoconical outer periphery throughout the entire length of said outer periphery and an inner peripheral surface defining the bore, the inner peripheral surface having a constricted portion of a smallest substantially uniform diameter, an upper portion extending upward from the constricted portion with a progressively increasing diameter and progressively decreasing thickness to define a tapered bore section and a lower portion of progressively decreasing thickness extending downward from the constricted portion to define a bore section having a radially outwardly stepped substantially uniform larger diameter portion than the constricted portion.

2. A tubular sealing device according to claim 1 wherein the soft elastic material is silicone rubber.

3. A tubular sealing device according to claim 1 wherein said constricted portion is of uniform diameter.

4. A tubular sealing device according to claim 3 wherein said bore section of said lower portion is of uniform diameter.

* * * * *